United States Patent
Hirai

(10) Patent No.: US 8,499,080 B2
(45) Date of Patent: Jul. 30, 2013

(54) CLUSTER CONTROL APPARATUS, CONTROL SYSTEM, CONTROL METHOD, AND CONTROL PROGRAM

(75) Inventor: Koichi Hirai, Kawasaki (JP)

(73) Assignee: Fujitsu Limited, Kawasaki (JP)

(*) Notice: Subject to any disclaimer, the term of this patent is extended or adjusted under 35 U.S.C. 154(b) by 472 days.

(21) Appl. No.: 12/398,365

(22) Filed: Mar. 5, 2009

(65) Prior Publication Data
US 2009/0234951 A1    Sep. 17, 2009

(30) Foreign Application Priority Data
Mar. 13, 2008  (JP) ................................ 2008-064015

(51) Int. Cl.
*G06F 15/173* (2006.01)
(52) U.S. Cl.
USPC .......................................... 709/226; 713/300
(58) Field of Classification Search
USPC .......................................... 709/226; 713/300
See application file for complete search history.

(56) References Cited

U.S. PATENT DOCUMENTS

| | | | |
|---|---|---|---|
| 6,105,051 A * | 8/2000 | Borkenhagen et al. | 718/103 |
| 7,571,255 B2 * | 8/2009 | Peddada | 709/248 |
| 2002/0091854 A1 | 7/2002 | Smith | |
| 2002/0145983 A1 * | 10/2002 | Block et al. | 370/254 |
| 2003/0097610 A1 * | 5/2003 | Hofner | 714/10 |
| 2005/0149684 A1 * | 7/2005 | Sankaran et al. | 711/162 |
| 2005/0246569 A1 | 11/2005 | Ballew et al. | |
| 2006/0112297 A1 * | 5/2006 | Davidson | 714/2 |
| 2007/0174659 A1 * | 7/2007 | Takuwa et al. | 714/4 |

FOREIGN PATENT DOCUMENTS

| | | |
|---|---|---|
| JP | 09-212470 | 8/1997 |
| JP | 09-282294 | 10/1997 |
| JP | 2004-519749 | 7/2004 |
| JP | 2006-309439 | 11/2006 |
| JP | 2007-533031 | 11/2007 |

OTHER PUBLICATIONS

Japanese Office Action issued Feb. 7, 2012 in corresponding Japanese Patent Application No. 2008-064015.

* cited by examiner

*Primary Examiner* — Thomas Dailey
(74) *Attorney, Agent, or Firm* — Staas & Halsey LLP

(57) ABSTRACT

A cluster control apparatus, cluster control system, and computer-readable recording medium are provided. The cluster control apparatus includes a switching unit that disconnects a first computer from a first group and disconnects a second computer belonging to a second group from the second group to cause the second computer to belong to the first group, when a first computer is unable to execute a job to be processed and a job executing unit that causes the second computer belonging to the first group to execute the job to be processed after the second computer have belonged to the first group by the switching unit.

12 Claims, 12 Drawing Sheets

CLUSTER CONTROL APPARATUS, CONTROL SYSTEM, CONTROL METHOD, AND CONTROL PROGRAM

CROSS-REFERENCE TO RELATED APPLICATIONS

This application is related to and claims priority to Japanese Patent Application No. 2008-64015 filed on Mar. 13, 2008 in the Japan Patent Office, and incorporated by reference herein.

BACKGROUND

1. Field

The embodiments discussed herein are directed to a cluster control apparatus, a control system, a control method, and a control program for disconnecting a server that is unable to execute a job to be processed.

2. Description of the Related Art

A cluster system that links a plurality of computers together to make them look like a single computer system has been used as a scientific and technical processing system or a corporate core system. The computers (hereinafter, referred to as "nodes") on the cluster system can be broadly classified into two types: compute nodes for performing computations and management nodes for managing all of the compute nodes.

In the cluster system, a single computation (hereinafter, this single computation is referred to as a "job") can be performed on a plurality of compute nodes or a plurality of computations are simultaneously performed on a plurality of compute nodes. Hereinafter, a job that is executed in parallel over a plurality of compute nodes is referred to as a "parallel job" and a single job executed by a single compute node is referred to as a "serial job".

FIG. 1 illustrates a case in which a job (parallel job) is executed on a plurality of compute nodes. When there are three compute nodes in a cluster system and a parallel job is executed using all of the compute nodes, if one compute node is stopped due to abnormality, etc., only two compute nodes are left. That is, in the cluster system, a job that is defined to need three compute nodes cannot be executed and even if the job can be executed by two compute nodes, the processing speed thereof decreases.

For such an occasion, a backup compute node may be prepared. A backup compute node can be manually or automatically prepared. In the automatic case, the operation thereof varies depending on software implementation.

Conventionally, an extra compute node can be installed from the beginning and the extra compute node is not used at normal operation as a first installation method. An operation method for job execution can be determined in advance and a compute node, though it is installed, is not used. As illustrated in FIGS. 2A and 2B, the configuration is such that although there are four compute nodes on a cluster system, only three of then are used for a job (see FIG. 2A). By such a configuration, although in normal times one compute node is not used, even if one of the compute nodes being used is stopped, a three-compute-node configuration is maintained, and thus, the job can be executed (see FIG. 2B).

Conventionally, a compute node can be stopped and not to be used as a second installation method. Specifically, as illustrated in FIGS. 3A and 3B, although there are four compute nodes on a cluster system, one of then is made to be stopped (see FIG. 3A). When a management node detects that one of the three compute nodes being in operation breaks down, the management node turns on power to the compute node being stopped, to install the compute node for the operation (see FIG. 3B). By this, even if one compute node being used is stopped, a three-compute-node configuration is maintained, and thus, the job operation is maintained.

Conventionally, as illustrated in FIGS. 4A and 4B, an operation can be performed by different compute node groups (hereinafter, referred to as "job execution groups") having different application purposes (see FIG. 4A), if a compute node in one job execution group is stopped, then a compute node in the other job execution group is used in a shared manner (see FIG. 4B) as a third installation method. In this method, the number of nodes needed for the job operation can be maintained.

Conventionally, a flexible cluster system is disclosed in which the roles of server apparatuses respectively belonging to clusters can be flexibly changed. An alternate processing scheme is disclosed in which in a tightly coupled multiprocessor system that includes a plurality of PGs (processor groups) and executes jobs by specifying the respective PGs, when a job that specifies a PG unable to execute a job is alternatively processed by another PG, the loads of the respective PGs are equalized. A mechanism is disclosed in which when performing booting or rebooting due to the occurrence of some kind of abnormality during normal OS operation, as a master processor used to start up a system, an abnormal processor is not selected.

SUMMARY

It is an aspect of the embodiments discussed herein to provide an cluster control apparatus that includes a switching unit that disconnects the first computer from the first group and disconnects a second computer belonging to a second group from the second group to cause the second computer to belong to the first group, when a first computer is unable to execute a job to be processed and a job executing unit that causes the second computer belonging to the first group to execute the job to be processed after the second computer have belonged to the first group by the switching unit.

It is an aspect of the embodiments discussed herein to provide a cluster system including a plurality of computers are to execute a job; a switching unit that disconnects a first computer belonging to a first group, and disconnects a second computer belonging to a second group from the second group to cause the second computer to belong to the first group, when the first computer is unable to execute a job to be processed; and a job executing unit that causes the second computer belonging to the first group to execute the job to be processed after the second computer have belonged to the first group.

It is an aspect of the embodiments discussed herein to provide a computer-readable recording medium storing a control program of a cluster control apparatus that controls a cluster for grouping of a first computer and a second computer, the control program causing the cluster control apparatus to execute a disconnecting the first computer from the first group, when a first computer is unable to execute a job to be processed; disconnecting a second computer belonging to a second group from the second group; and causing the second computer disconnected from the second group to execute the job to be processed after the second computer have belonged to the first group.

These together with other aspects and advantages which will be subsequently apparent, reside in the details of construction and operation as more fully hereinafter described

DETAILED DESCRIPTION OF THE EMBODIMENTS

Figure 5:
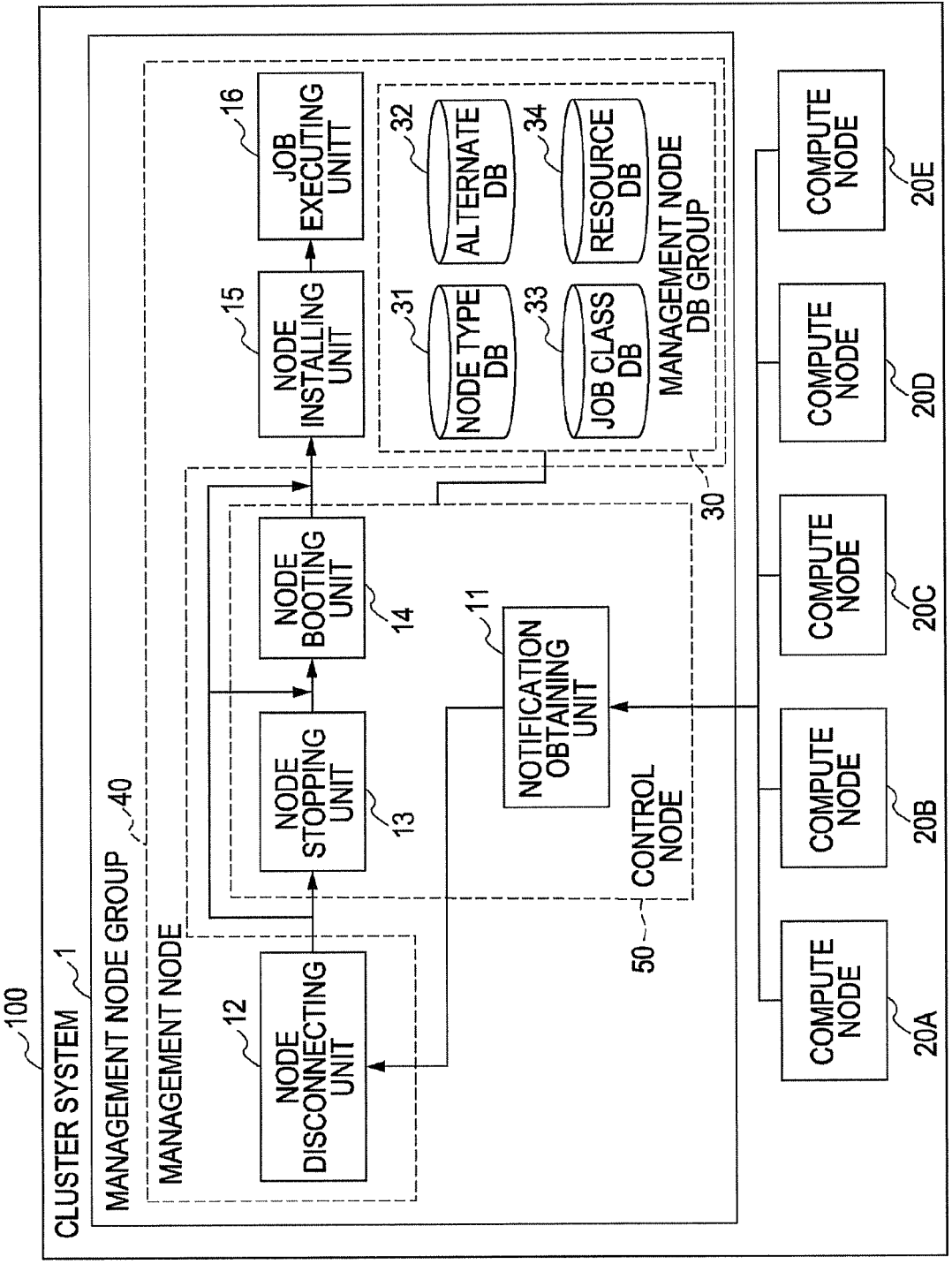
FIG. 5 illustrates an exemplary cluster system according to an embodiment.

A cluster system according to an embodiment is illustrated in FIG. 5. A cluster system 100 (control system) includes a management node group 1 (cluster control apparatus) that manages and controls a cluster configuration of compute nodes; and compute nodes 20A, 20B, 20C, 20D, and 20E that can execute a job.

The management node group 1 according to an embodiment can perform overall control of the cluster system 100. The management node group 1 includes a control node 50 including a notification obtaining unit 11, a node stopping unit 13, and a node booting unit 14; and a management node 40 including a node disconnecting unit 12, a node installing unit 15, a job executing unit 16, and a management node DB group 30 (DB: Database). Although the management node group 1 according to an embodiment has a two-node configuration, i.e., the management node 40 and the control node 50, to distribute a load, the configuration is not limited thereto. Servers, the management node 40 and the control node 50, may be configured as a single cluster control apparatus. The management node DB group 30 can be read and written by the control node 50.

The notification obtaining unit 11 can receive an SNMP Trap notification in SNMP (Simple Network Management Protocol) which is a protocol that defines a method of communicating information for monitoring or controlling network devices on an IP network, from a compute node that is unable to execute a job to be processed. The notification obtaining unit 11 can obtain from the compute node a disconnection request by an ssh (Secure Shell) command which is a command using encryption and authentication techniques to safely communicate with a remote computer (hereinafter, an SNMP Trap notification and a disconnection request by an ssh command are referred to as "alerts", where necessary). As information about a situation where a job to be processed cannot be executed, for example, in SNMP Trap, OID which is a predetermined identifier used by a system to manage the functions of network devices is provided and in the ssh command, an argument is provided after a switching command.

The node disconnecting unit 12 can disconnect, when the notification obtaining unit 11 obtains an alert, the compute node that is unable to execute a job to be processed, from a job execution group to which the compute node belongs.

The node stopping unit 13 can turn off power to the compute node that is unable to execute a job to be processed and that is disconnected by the node disconnecting unit 12.

The node booting unit 14 can turn on power to a compute node that is to newly belong to the job execution group to which the compute node that is unable to execute a job to be processed has belonged, if power to the compute node is turned off.

The node installing unit 15 can disconnect the compute node belonging to another job execution group than the job execution group, from that another job execution group and installs the compute node in the job execution group. When the compute node to be installed is currently executing a job, the node installing unit 15 waits to perform installation until the job is completed and then installs the compute node in the job execution group as soon as the job is completed. Alternatively, the node installing unit 15 installs the compute node in the job execution group with the job being executed. The disconnection from another job execution group may be performed by the node disconnecting unit 12.

The job executing unit 16 refers to a corresponding table held in a resource DB 34 and thereby causes compute nodes belonging to the job execution group to execute a job. The job executing unit 16 can cause compute nodes belonging to a job execution group that is newly reconfigured by the node disconnecting unit 12 and the node installing unit 15 to execute a job to be processed. When the number of compute nodes required to execute a job is insufficient, the execution is put on hold until a compute node(s) required to execute the job become(s) idle.

While a job is being processed (while a computation is performed), a situation occurs where a compute node becomes unable to execute a job to be processed, the job executing unit 16 cancels the job being executed and causes, after a job execution group is reconfigured, compute nodes belonging to the job execution group to re-execute the cancelled job.

The management node DB group 30 can be a set of a plurality of DBs and includes a node type DB 31, an alternate DB 32, a job class DB 33, and the resource DB 34.

The node type DB 31 holds, as a table, the correspondence between a node name, a node type, and a node state. As used herein, the node name uniquely identifies a compute node, such as an IP address or a host name. The node type indicates whether the compute node is switchable over job execution groups (type name: AJ) or not (type name: J). The node state indicates whether the compute node is disconnected ("D" (representing Disable)) from or installed ("E" (representing Enable)) in a job execution group.

The alternate DB 32 can hold a corresponding table which is used to determine, when a failure or the like occurs in any of compute nodes, to which compute node the failed compute node is switched. The alternate DB 32 holds, for example, the correspondence between the compute nodes 20A and 20E as a corresponding table. Alternatively, the alternate DB 32 holds, as a corresponding table, the correspondence between job execution groups, e.g., when a failure occurs in a compute node belonging to a job execution group #1, any one of compute nodes belonging to a job execution group #2 becomes an alternate thereto. Note that when the alternate DB 32 holds the correspondence between job execution groups as a corresponding table, switching priorities are further assigned to compute nodes and the compute nodes are switched in order of the priorities. The alternate DB 32 holds information indicating to which compute node a compute node is currently switched.

The job class DB 33 can hold a corresponding table indicating which compute nodes currently belong to a job execution group (which may hereinafter be referred to as a job class), i.e., the correspondence between a job execution group and compute nodes belonging to the job execution group. The job class DB 33 holds initial values of the above-described correspondence.

The resource DB 34 can hold a corresponding table between identification information on a job and compute nodes executing the job and holds information on a job execution state (a standby state, completed, etc.) and an idle compute node which is a compute node not executing a job.

The operations of the above-described units can be by a central processing unit (CPU), which is not illustrated and is included in the management node 40 and the control node 50, executing software stored in a storage medium (nonvolatile or volatile) which is not illustrated.

A summary of a control method of compute nodes performed by the management node group 1 can be described with reference to FIGS. 6 and 7.

Figure 6:
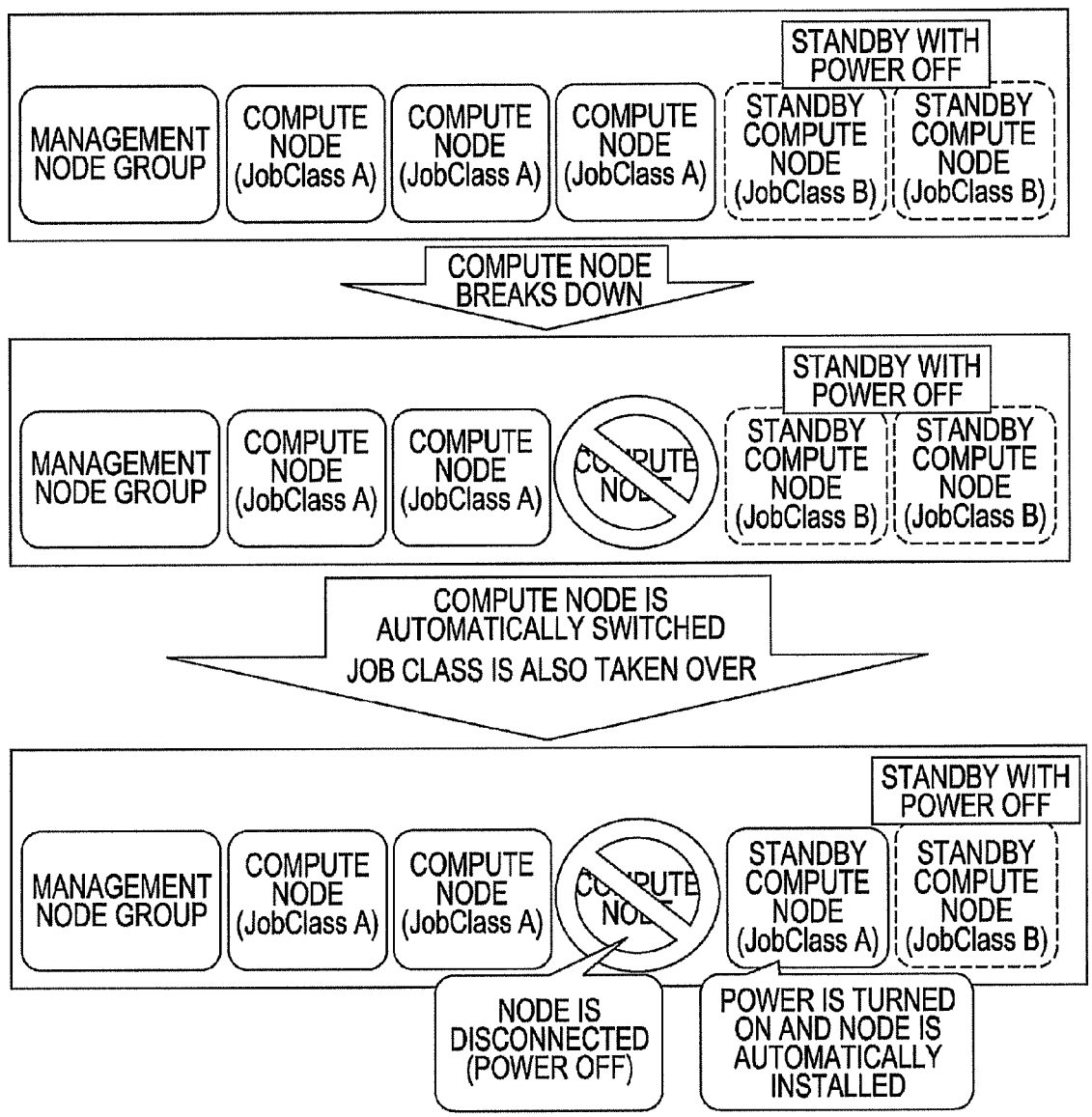
FIG. 6 illustrates a control method of compute nodes performed by a management node group according to an exemplary embodiment (power to compute nodes in one job execution group is turned off)

FIG. 6 illustrates five exemplary compute nodes, three compute nodes are in operation and two compute nodes are on standby. The two compute nodes on standby are in a power-off state (see the top part of FIG. 6). The compute nodes in operation belong to a job execution group A and the compute nodes on standby belong to a job execution group B.

When, as illustrated in the middle part of FIG. 6, one of the compute nodes in operation breaks down, as illustrated in the bottom part of FIG. 6, the management node group 1 can disconnect the broken-down compute node from its job execution group and turns off power to the broken-down compute node so that the broken-down compute node is not installed in the job execution group again by user misoperation, etc. The management node group 1 turns on power to one of the compute nodes on standby and installs the compute node whose power is turned on in the job execution group.

Figure 7:
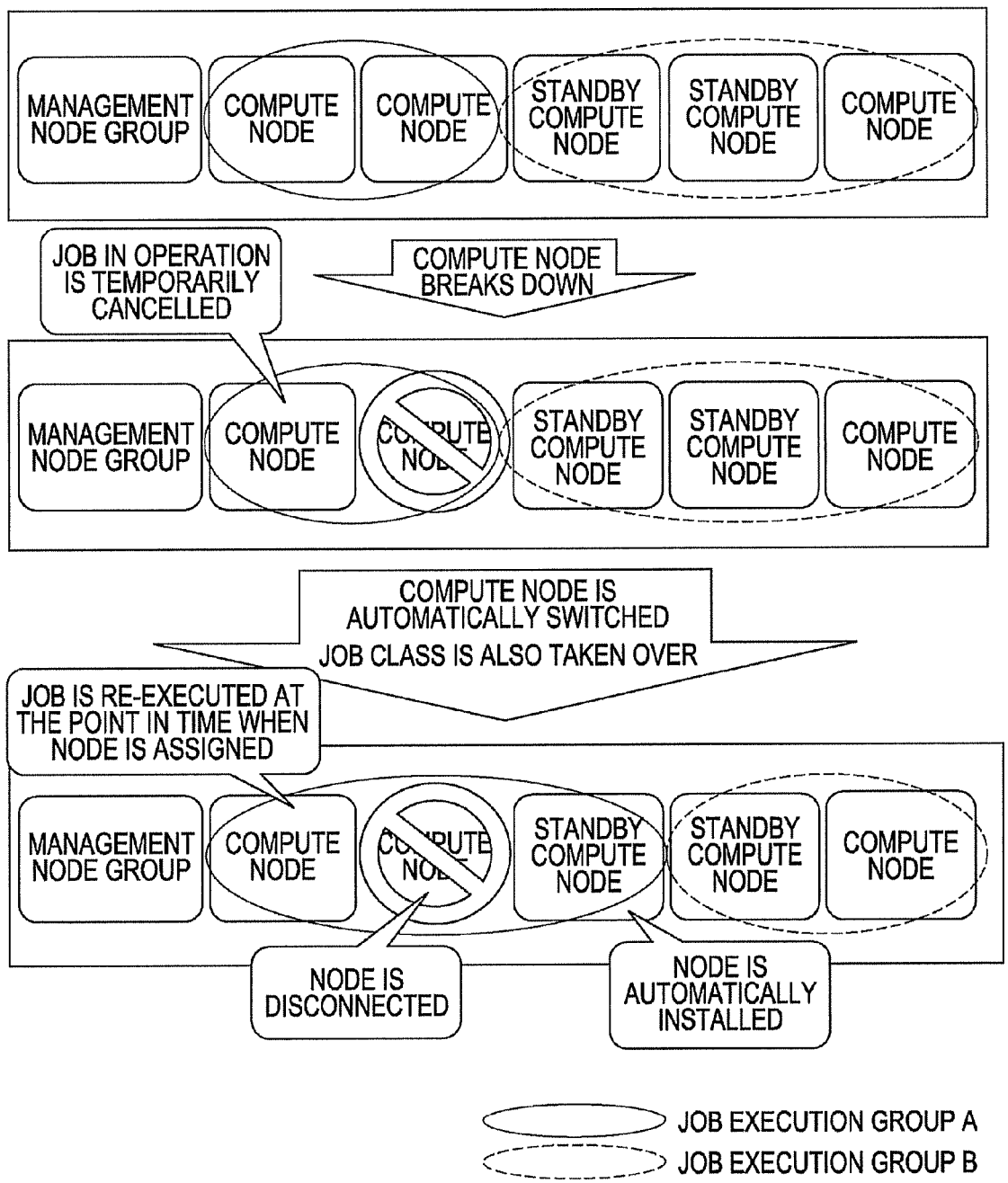
FIG. 7 illustrates a control method of compute nodes performed by the management node group according to an exemplary embodiment (both job execution groups are in operation)

FIG. 7 illustrates a case in which a plurality of job execution groups is defined will be described. In FIG. 7, there are two job execution groups, two compute nodes belong to one job execution group (job execution group A) and three compute nodes belong to the other job execution group (job execution group B) (see the top part of FIG. 7).

When, in the middle part of FIG. 7, one of the compute nodes belonging to the job execution group A breaks down, a result of a job having been executed by the compute nodes in the job execution group A has a high probability of being unstable and thus the job is temporarily cancelled at this point. The job cancellation can be s performed by, for example, the management node group 1 issuing a KILL command using ssh, etc., to a compute node that belongs to the job execution group A and executes the job affected by the broken-down node.

As illustrated in the bottom part of FIG. 7, the management node group 1 disconnects the broken-down compute node from the job execution group A and installs a compute node in the job execution group B in the job execution group A. At this point in time the management node group 1 turns off power to the compute node disconnected due to the breakdown and turns on power to the compute node to be installed in the job execution group A, if power to the compute node is turned off. After the compute node newly belongs to the job execution group A, the cancelled job is re-executed.

Figure 8:
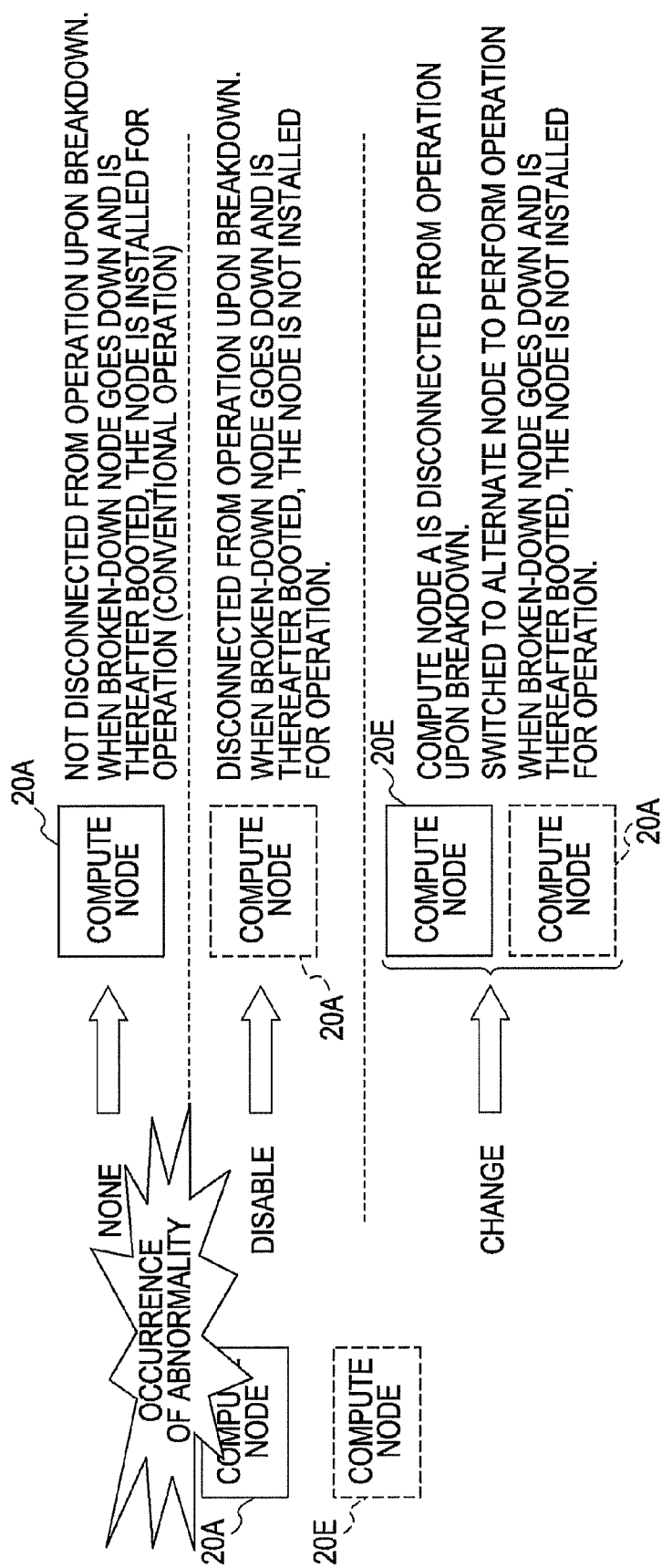
FIG. 8 illustrates exemplary modes of an overall control and management module according to an embodiment.
Figure 9:
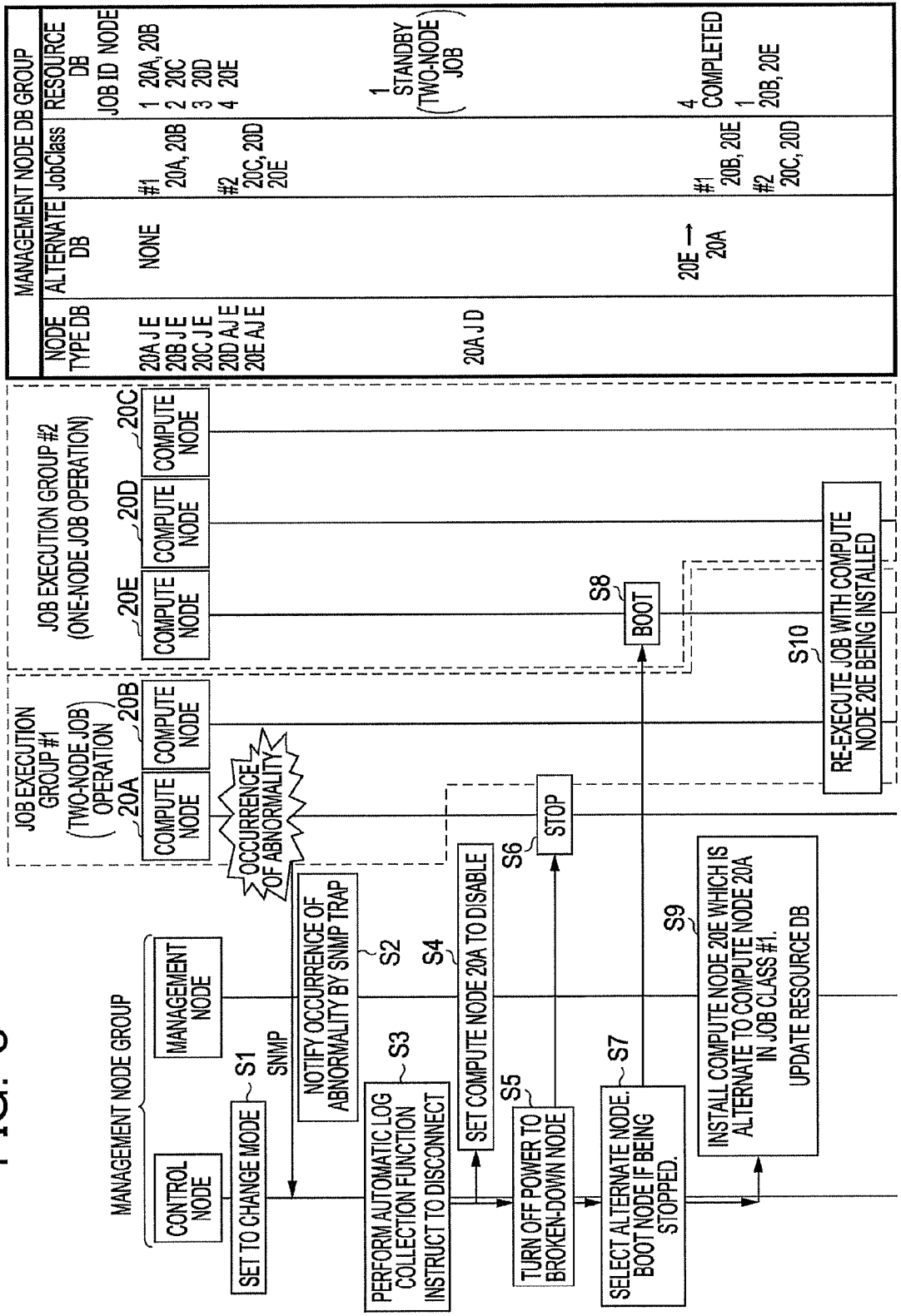
FIG. 9 illustrates an exemplary process (SNMP Trap notification) performed by the cluster system and is a diagram showing an example of data transition in a management node DB group, according to an embodiment.

When an execution module that performs overall control and management of a cluster is activated, the cluster system 100 according to an embodiment can specify the behavior for the case in which a failure or the like occurs in a compute node, by three modes "NONE", "DISABLE", and "CHANGE". FIG. 8 illustrates a compute node 20A that belongs to a predetermined job execution group and a compute node 20E belongs to another job execution group and the compute node 20E is defined as an alternate compute node to the compute node 20A. FIG. 8 illustrates compute nodes by solid lines that belong to the predetermined job execution group.

The "NONE" mode is a mode in which the compute node is not disconnected from an operation (job execution group) even when a compute node breaks down, and when the broken-down compute node is stopped and thereafter booted, the compute node is installed for the operation (job execution group).

The "DISABLE" mode is a mode in which when a compute node breaks down, the compute node is disconnected from an operation (job execution group), and even when the broken-down compute node is stopped and thereafter booted, the compute node is not installed for the operation (job execution group). Note that the "DISABLE" mode is omitted in the following description.

The "CHANGE" mode is a mode in which when a compute node breaks down, the broken-down compute node is disconnected from an operation (job execution group), and an alternate compute node is installed for the operation (job execution group). As with the "DISABLE" mode, even when the broken-down compute node is stopped and thereafter booted, the compute node is not installed for the operation (job execution group).

Management and control of compute nodes performed by the cluster system 100 may be described with reference to time charts in FIGS. 9 to 12. A transition of various information held in the management node DB group 30 and associated with the time charts is also illustrated at the right of the time charts in FIGS. 9 to 12.

Two job execution groups, a job execution group #1 and a job execution group #2, are defined in the job class DB 33 as its initial values. As initial values of the job class DB 33, the compute nodes 20A and 20B belong to the job execution group #1 and the compute nodes 20C, 20D, and 20E belong to the job execution group #2. Note that in the time charts in FIGS. 9 to 12, the job execution groups are illustrated by dashed lines.

The job execution group #1 executes a two-node job (parallel job) and the job execution group #2 executes a one-node job (serial job) (defined in the resource DB 34). Furthermore, as an alternate compute node to the compute node 20A, the compute node 20E is defined as an initial value of the alternate DB 32 (note that the initial value of the alternate DB 32 is not illustrated).

As initial values of the node type DB 31, the compute nodes 20A, 20B, and 20C are defined as non-switchable compute nodes (J) and compute nodes (E) whose node states are such that they are installed in their respective job execution groups, and the compute nodes 20D and 20E are defined as switchable compute nodes (AJ) and compute nodes (E) whose node states are such that they are installed in their respective job execution groups.

Figure 1:
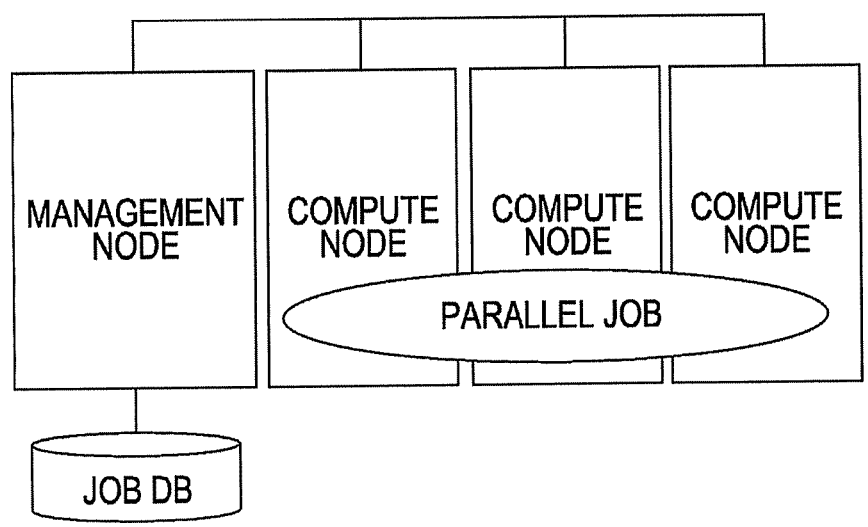
FIG. 1 illustrates a conventional cluster system in which a job (parallel job) is executed on a plurality of compute nodes.
Figure 2A:
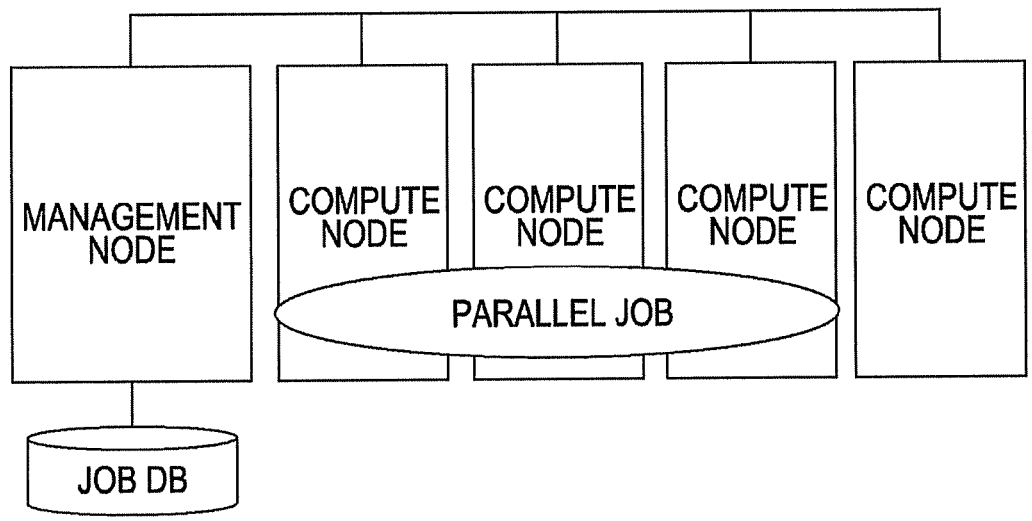
FIGS. 2A and 2B illustrate a conventional cluster system in which an extra compute node is installed in advance in a job execution group.
Figure 2B:
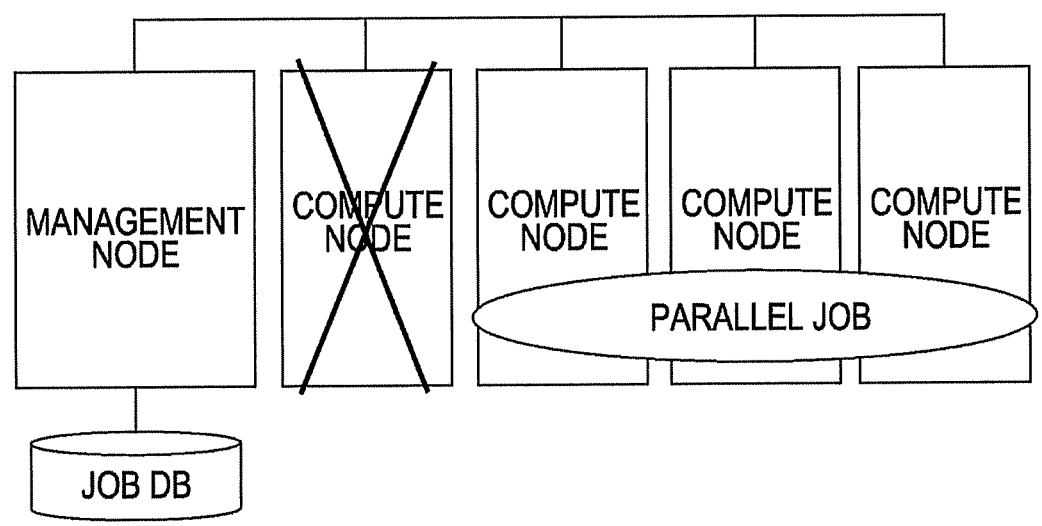
Figure 3A:
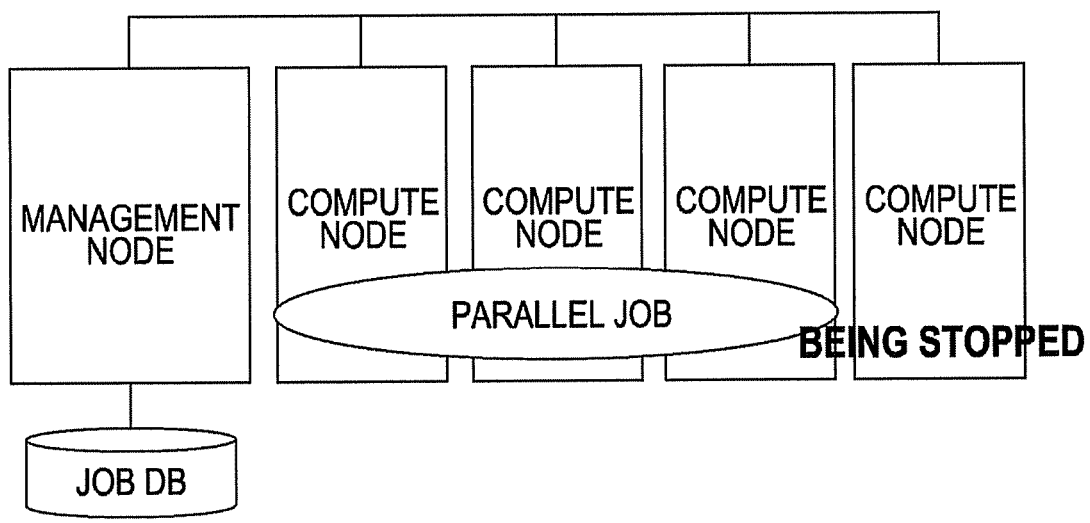
FIGS. 3A and 3B illustrate an example of a conventional cluster system in which power to an unused compute node is turned off.
Figure 3B:
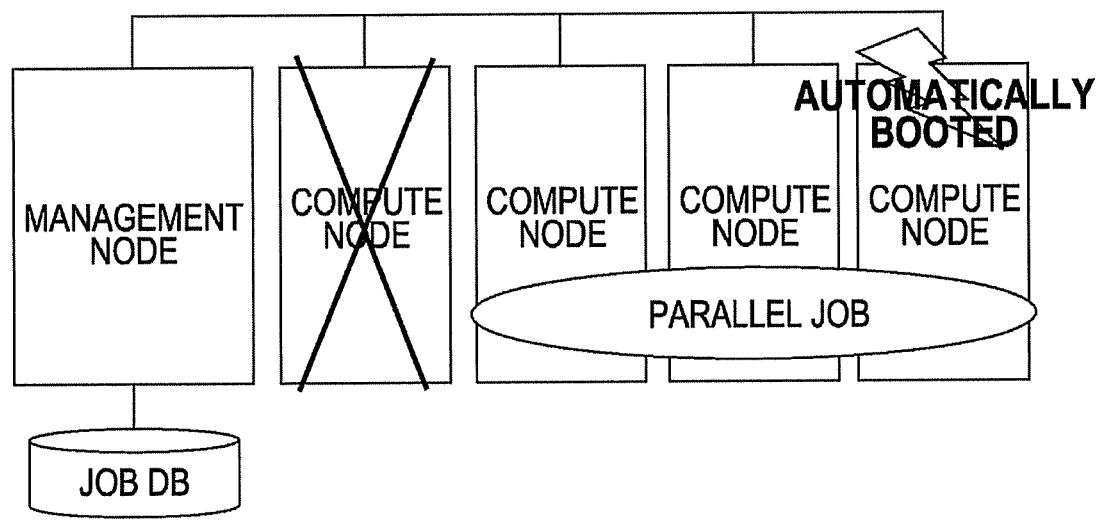
Figure 4A:
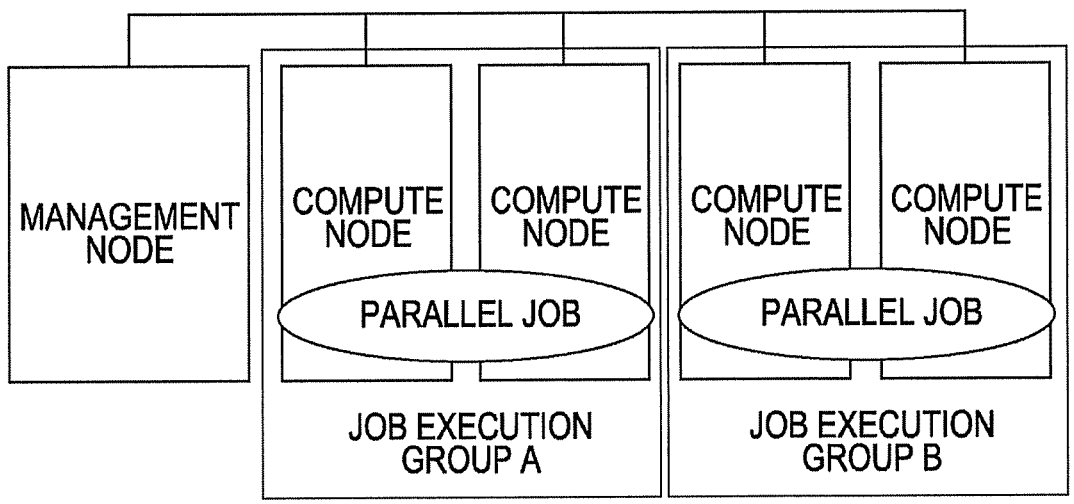
FIGS. 4A and 4B illustrate a conventional cluster system in which compute nodes are grouped into job execution groups.
Figure 4B:
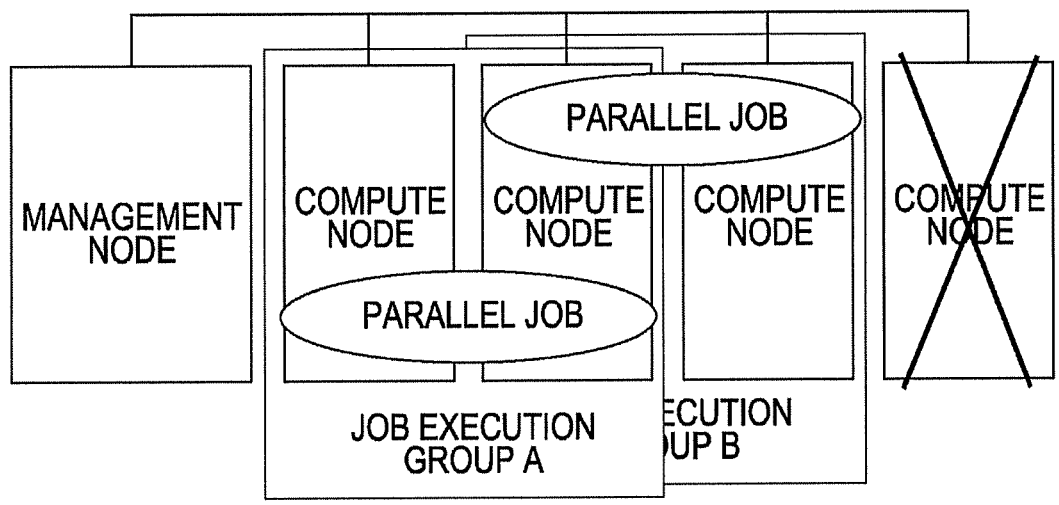

A time chart for when a failure occurs in the compute node 20A and an SNMP Trap is transmitted is illustrated in FIG. 1.

Of execution modules, an overall control and management module that performs overall control and management of a cluster is executed on the control node 50 in a "CHANGE" mode (operation S1). When an abnormality occurs in the compute node 20A and an SNMP Trap is notified to the control node 50 (operation S2), the notification obtaining unit 11 obtains the SNMP Trap and acquires a host name of the compute node in which an abnormality occurs and OID of the SNMP Trap.

The notification obtaining unit 11 can obtain information indicating the occurrence of an abnormality (information about a situation where a job is unable to be executed), from the obtained OID and instructs the job executing unit 16 of the management node 40 to cancel the job and instructs the node disconnecting unit 12 to disconnect the compute node 20A (operation S3).

The job executing unit 16 cancels the job currently being in operation on the compute node 20B, by using ssh (operations S4 and S4a). The job executing unit 16 can update idle compute node information in the resource DB 34 from "none" to "20B". The node disconnecting unit 12 having been instructed to perform disconnection updates the node state of the compute node 20A held in the node type DB 31 from "E" to "D" to disconnect the compute node 20A from the job execution group #1 (operation S4).

The node stopping unit 13 thereafter performs control to turn off power to the compute node 20A which is a broken-down node (operation S5), whereby the compute node 20A is stopped (operation S6).

The node booting unit 14 can refer to the alternate DB 32 and thereby selects a compute node (in this example, the compute node 20E) that serves as an alternate to the compute node 20A and boots the compute node 20E if the compute node 20E is being stopped (operations S7 and S8).

The node installing unit 15 can refer to the alternate DB 32 and switches, in the job class DB 33, the compute node 20E from the job execution group #2 to the job execution group #1 and thereby updates the job class DB 33. By the node installing unit 15 updating the job class DB 33, the compute node 20E is disconnected from the job execution group #2 and the compute node 20E is installed in the job execution group #1, whereby the compute node 20E is installed in the job execution group #1 (operation S9). At this timing, the node installing unit 15 updates the alternate DB 32 such that the compute node 20A is currently switched to the compute node 20E. The idle compute node information in the resource DB 34 is also updated.

When at this point in time the compute node 20E is in the process of executing another job (the resource DB 34 is referred to), the compute node 20E continues to execute the job currently being executed. When the job is completed (when the execution state in the resource DB 34 becomes "completed"), the compute node 20E is switched.

At operation S9, the node installing unit 15 updates the correspondence between job identification information and a compute node in the resource DB 34, along with the change in the job execution groups.

The job executing unit 16 refers to the updated resource DB 34 and thereby causes compute nodes (compute nodes 20B and 20E) belonging to the job execution group #1 to re-execute the cancelled job (operation S10). Also, the idle compute node information in the resource DB 34 is updated.

Figure 10:
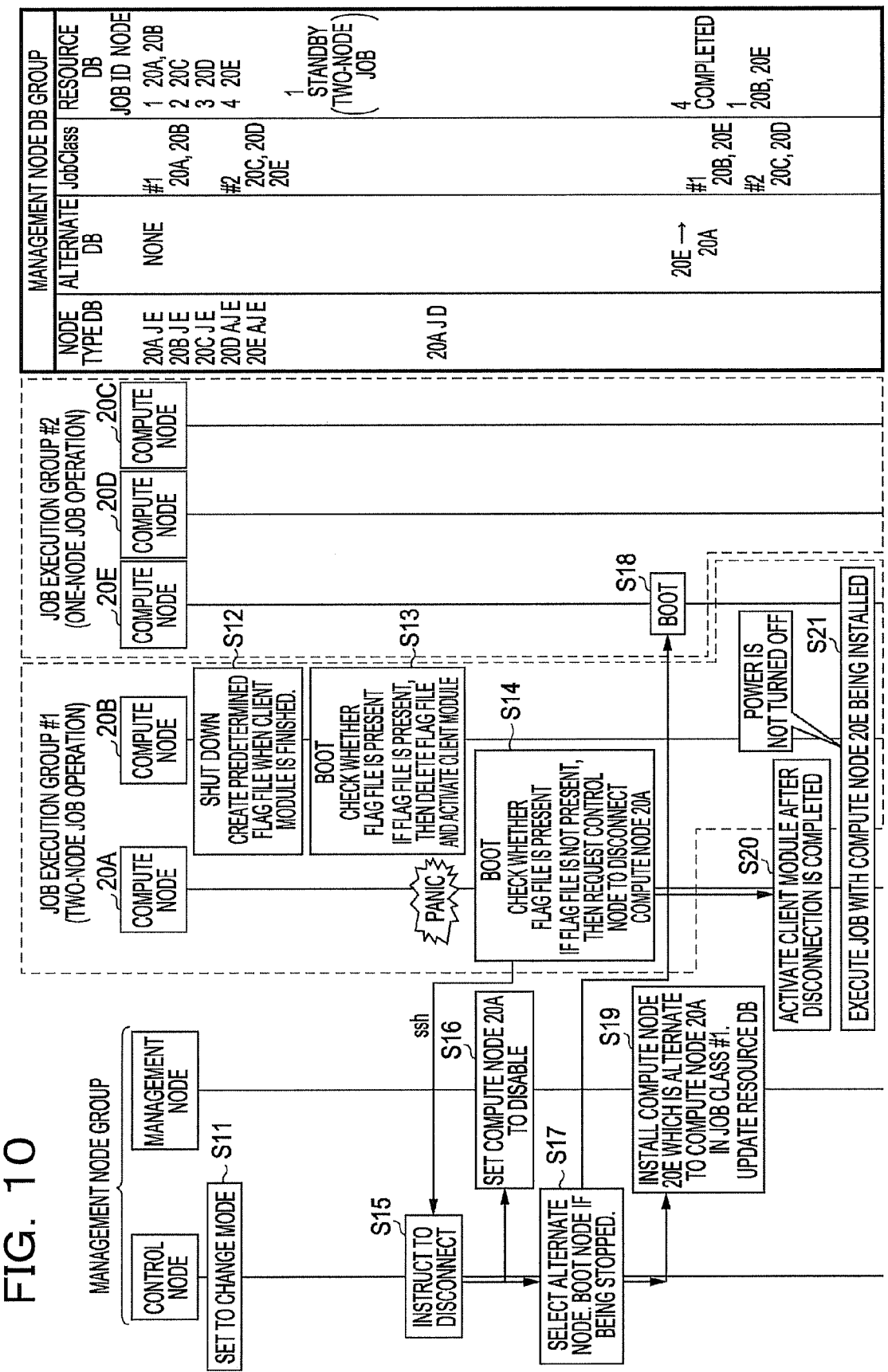
FIG. 10 is a time chart depicting an example of a process (compute node PANIC) performed by the cluster system and is a diagram showing an example of data transition in the management node DB group, according to an embodiment.

A time chart for when Panic occurs in the compute node 20A and an SNMP Trap is not transmitted is illustrated in FIG. 10. Note that in FIG. 10, an example in which a compute node is normally stopped and booted is illustrated at operations S12 and S13 and an example in which a compute node is booted after being abnormally stopped due to Panic is illustrated at operation S14 and subsequent operations. Note also that an overall control and management module is executed on the control node 50 in a "CHANGE" mode (operation S11).

Using the compute node 20B as an example, normal stop and boot processes of a compute node according to an embodiment are illustrated at operations S12 and S13. When a client module of a cluster (a client module runs on each compute node) is stopped, a predetermined flag file is created (operation S12). Thereafter, the compute node 20B is booted and when a client module is activated, the client module checks whether the flag file is present and if the flag file is present, then the flag file is deleted and the client module is normally activated (operation S13).

A case in which the compute node 20A is abnormally stopped due to Panic can be described at operation S14 and subsequent operations. When the compute node 20A is abnormally stopped due to Panic, the compute node 20A is automatically booted. However, since a normal stop process has not been performed as in the above-described operation S12, when a client module is activated, the client module cannot check on a predetermined flag file that may be present. When the predetermined flag file cannot be checked on, the client module requests the control node 50 to disconnect the compute node 20A, using ssh or the like (operation S14).

After obtaining the disconnection request by ssh, the notification obtaining unit 11 issues a job cancellation instruction to the job executing unit 16 and instructs the node disconnecting unit 12 to perform disconnection (operation S15). The job executing unit 16 having received the job cancellation instruction and the node disconnecting unit 12 having requested to perform disconnection cancel a job by the same technique as that at operation S4 and disconnect the compute node 20A (operations S16 and S16a). When the compute node 20E which is an alternate compute node is being stopped, the node booting unit 14 boots the compute node 20E (operations S17 and S18).

The node installing unit 15 can disconnect the compute node 20E from the job execution group #2 by the same operation as that at operation S9 and installs the compute node 20E in the job execution group #1 (operation S19). Note that, as with operation S9, when at this point in time the compute node 20E is in the process of executing another job, the compute node 20E continues to execute the job currently being executed and when the job is completed, the compute node 20E is switched.

After disconnection of the compute node 20A by the node disconnecting unit 12 at operation S16 is completed, the compute node 20A receives a boot instruction from the management node 40 by ssh or the like and thereby activates a client module (operation S20).

When the job executing unit 16 is requested by a user to execute a parallel job, the job executing unit 16 refers to the resource DB 34 and thereby causes compute nodes (compute nodes 20B and 20E) belonging to the job execution group #1 to execute a parallel job (operation S21). When the execution of a job is cancelled, the job executing unit 16 causes compute nodes (compute nodes 20B and 20E) belonging to the job execution group #1 to re-execute the cancelled job. Although power to the compute node 20A is not turned off, the compute node 20A is disconnected from the job execution group #1 at operation S16 and thus does not execute a job.

As another example of a situation where a job to be processed is unable to be executed, in addition to the case in which a failure occurs in a compute node, there is a case in which maintenance of a compute node is performed. When maintenance is performed on a compute node, the compute node needs to be disconnected from its job execution group so that the influence of the maintenance is not reflected in a job. A disconnection process from a job execution group and an installation process for such a case are illustrated in the time charts in FIGS. 11 and 12. Note that in FIGS. 11 and 12, description is made of the case in which maintenance is performed on the compute node 20A. In the following description, too, a precondition (the initial values of the management node DB group 30) is the same as that described in the aforementioned FIGS. 9 and 10.

Figure 11:
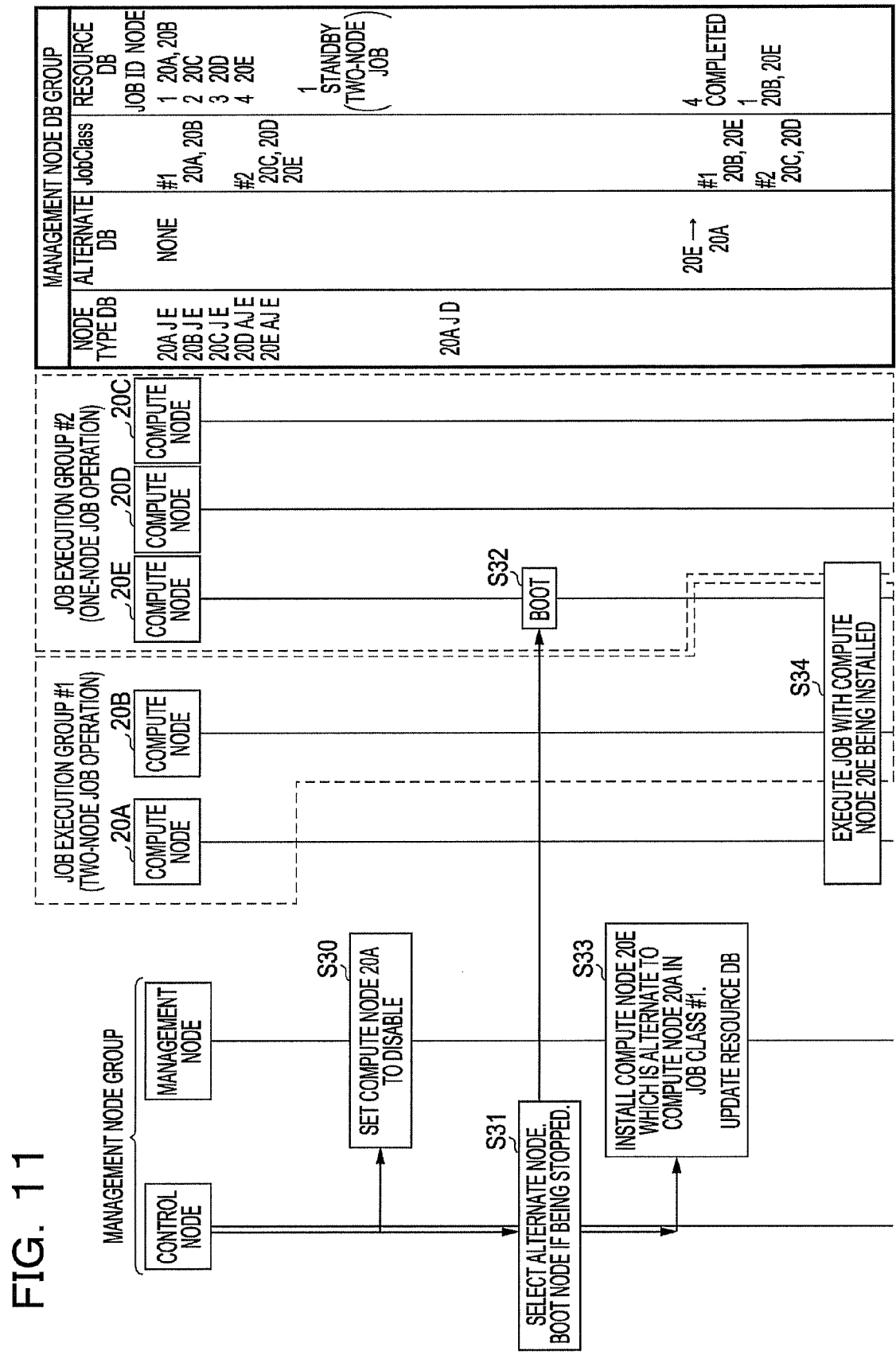
FIG. 11 is a time chart depicting an example of a process performed prior to the start of maintenance of a compute node and is a diagram showing an example of data transition in the management node DB group, according to an embodiment.

A job execution group switching process of compute nodes performed prior to the start of maintenance is illustrated in FIG. 11 and described. Note that although a series of operations illustrated in FIG. 11 are performed by being triggered by execution of a maintenance start command by a user, operations may be individually performed.

When a maintenance start command which uses, as an argument, a node name of a compute node to be subjected to maintenance is activated on the control node 50 by the user, as with the operation at operation S4, the node disconnecting unit 12 disconnects the compute node 20A from the job execution group #1 (operation S30). Thereafter, by the same operation as that at operation S7, the node booting unit 14 selects an alternate node (compute node 20E) to the compute node 20A and boots the compute node 20E if the compute node 20E is being stopped (operations S31 and S32).

By the same operation as that at operation S9, the node installing unit 15 disconnects the compute node 20E which is an alternate to the compute node 20A from the job execution group #2 and installs the compute node 20E in the job execution group #1 and then updates the resource DB 34 (operation S33).

When the job executing unit 16 is requested by the user to execute a parallel job, the job executing unit 16 can refer to the resource DB 34 and thereby causes compute nodes (compute nodes 20B and 20E) belonging to the job execution group #1 to execute a parallel job (operation S34). Note that although power to the compute node 20A is not turned off, the compute node 20A is disconnected from the job execution group #1 and thus does not execute a job.

For disconnection of a compute node from its job execution group and installation of the compute node, when the compute node is in the process of executing a job, the job currently being executed is continuously processed. When the job being executed is completed (when the execution state in the resource DB 34 becomes "completed"), the compute node is disconnected from (or installed in) its job execution group.

Figure 12:
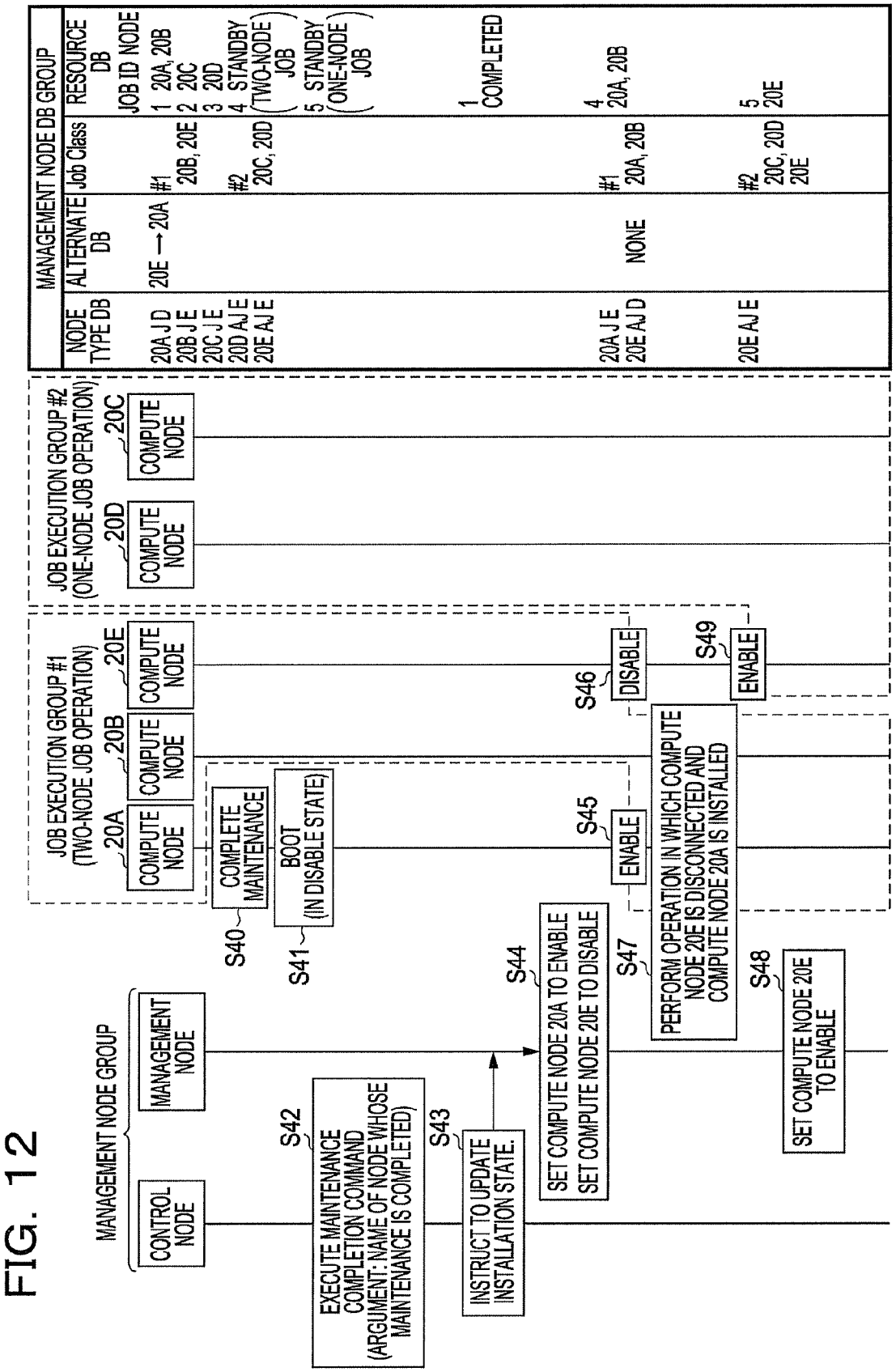
FIG. 12 is a time chart depicting an example of a process performed after the completion of the maintenance of the compute node and is a diagram showing an example of data transition in the management node DB group, according to an embodiment.

A process of bringing back the configuration of job execution groups when maintenance of the compute node 20A is completed will be described with reference to FIG. 12.

Maintenance of the compute node 20A is completed (operation S40) and the compute node 20A is booted (operation S41). Note that, in an embodiment, when a compute node is stopped, if the compute node is disconnected from its job execution group (when the node state of the compute node 20A held in the node type DB 31 is "D"), even when the compute node is booted, the compute node is not automatically installed in the job execution group.

When a maintenance completion command which uses, as an argument, a node name of the compute node whose maintenance is completed can be executed on the control node 50 (operation S42), the control node 50 instructs the management node 40 to perform installation (operation S43).

The node installing unit 15 of the management node 40 having been instructed to perform installation changes the node state of the compute node 20A in the node type DB 31 to "E" to install the compute node 20A in the job execution group #1. The node disconnecting unit 12 changes the node state of the compute node 20E in the node type DB 31 to "D" and thereby disconnects the compute node 20E from the job execution group #1 (operations S44, S45, and S46).

At this point in time, the correspondence held in the resource DB 34 can be updated and an operation in which the compute node 20E is disconnected from the job execution group #1 and the compute node 20A is installed (execution of a job) is performed (operation S47).

The node installing unit 15 can install the compute node 20E in the job execution group #2 (operations S48 and S49), whereby the correspondence between the job execution groups and the compute nodes which is obtained prior to the maintenance is obtained.

Furthermore, a program that causes a computer composing the management node group (cluster control apparatus) to perform the above-described operations can be provided as a control program. The program can be executed by a computer composing the management node group (cluster control apparatus) by storing the program in a computer-readable recording medium. Examples of the computer-readable recording medium include internal storage apparatuses such as a ROM and a RAM that are installed in a computer, portable storage media such as CD-ROMs, flexible disks, DVD discs, magneto-optical disks, and IC cards, databases that hold a computer program, or other computers and databases thereof, and furthermore transmission media on lines.

The embodiments can be implemented in computing hardware (computing apparatus) and/or software, such as (in a non-limiting example) any computer that can store, retrieve, process and/or output data and/or communicate with other computers. The results produced can be displayed on a display of the computing hardware. A program/software implementing the embodiments may be recorded on computer-readable media comprising computer-readable recording media. The program/software implementing the embodiments may also be transmitted over transmission communication media. Examples of the computer-readable recording media include a magnetic recording apparatus, an optical disk, a magneto-optical disk, and/or a semiconductor memory (for example, RAM, ROM, etc.). Examples of the magnetic recording apparatus include a hard disk device (HDD), a flexible disk (FD), and a magnetic tape (MT). Examples of the optical disk include a DVD (Digital Versatile Disc), a DVD-RAM, a CD-ROM (Compact Disc-Read Only Memory), and a CD-R (Recordable)/RW. An example of communication media includes a carrier-wave signal.

Further, according to an aspect of the embodiments, any combinations of the described features, functions and/or operations can be provided.

The many features and advantages of the embodiments are apparent from the detailed specification and, thus, it is intended by the appended claims to cover all such features and advantages of the embodiments that fall within the true spirit and scope thereof. Further, since numerous modifications and changes will readily occur to those skilled in the art, it is not desired to limit the inventive embodiments to the exact construction and operation illustrated and described, and accordingly all suitable modifications and equivalents may be resorted to, falling within the scope thereof.

What is claimed is:

1. A cluster control apparatus comprising:
   an alternate information storage unit arranged to hold alternate information that defines to which computer a computer unable to execute a job is switched;
   a resource information storage unit arranged to hold resource information defining a relationship among a job, a computer executing the job, and a state of the job expressing whether execution of the job is completed;
   a switching unit that disconnects a first computer from a first group, disconnects a second computer belonging to a second group from the second group, and installs the second computer in the first group based on the alternate information held in the alternate information storage unit, when the first computer is unable to execute a first job to be processed; and
   a job executing unit that causes the second computer belonging to the first group to execute the first job to be processed when the second computer belongs to the first group,
   wherein when the second computer belonging to the second group is in a process of executing a second job, the switching unit installs the second computer in the first group after the executing second job is completed based on the resource information held in the resource information storage unit.

2. The cluster control apparatus according to claim 1, wherein the switching unit further turns off power to the first computer that is unable to execute the first job to be processed.

3. The cluster control apparatus according to claim 1, wherein the switching unit further turns on the power to the second computer when power to the second computer in the second group that is to belong to the first group is turned off, and installs the second computer belonging to the second group to belong to the first group.

4. The cluster control apparatus according to claim 1, wherein when the first computer becomes unable to execute the first job, the job executing unit further cancels the first job and causes the second computer belonging to the first group to execute the cancelled first job when the second computer belongs to the first group.

5. A cluster system comprising:
   a plurality of computers;
   an alternate information storage unit arranged to hold alternate information that defines to which computer a computer unable to execute a job is switched;
   a resource information storage unit arranged to hold resource information defining a relationship among a job, a computer executing the job, and a state of the job expressing whether execution of the job is completed;
   a switching unit that disconnects a first computer of the plurality of computers belonging to a first group, and disconnects a second computer of the plurality of computers belonging to a second group from the second group and installs the second computer in the first group based on the alternate information held in the alternate information storage unit, when the first computer is unable to execute a first job to be processed; and
   a job executing unit that causes the second computer belonging to the first group to execute the first job to be processed when the second computer belongs to the first group,
   wherein when the second computer belonging to the second group is in a process of executing a second job, the switching unit delays causing the second computer to belong to the first group until after the executing second job is completed based on the resource information held in the resource information storage unit.

6. The cluster system according to claim 5, wherein the switching unit further turns off power to the first computer that is unable to execute the first job to be processed.

7. The control system according to claim 5, wherein the switching unit further turns on the power to the second computer when power to the second computer in the second group that is to belong to the first group is turned off, and installs the second computer belonging to the second group in the first group.

8. The control system according to claim 5, wherein when the first computer become unable to execute the first job, the job executing unit further cancels the first job, and causes the second computer belonging to the first group to execute the cancelled first job after the second computer have belonged to the first group.

9. A non-transitory computer-readable recording medium storing a control program of a cluster control apparatus that controls a cluster for grouping of a first computer and a second computer, the control program causing the cluster control apparatus to execute:
   disconnecting the first computer from a first group, when the first computer is unable to execute a first job to be processed;
   disconnecting the second computer belonging to a second group from the second group based on alternate information that defines to which computer a computer unable to execute a job is switched;
   installing the second computer in the first group; and
   causing the second computer to execute the first job to be processed when the second computer belongs to the first group,
   wherein the control program further causes the second computer to belong to the first group after an executing second job is completed based on resource information defining a relationship among a job, a computer executing the job, and a state of the job expressing whether execution of the job is completed, when the second computer belonging to the second group is in a process of executing the second job.

10. The non-transitory computer-readable recording medium according to claim 9, wherein the control program further causes the cluster control apparatus to execute:
    turning off power to the first computer that is unable to execute the first job to be processed.

11. The non-transitory computer-readable recording medium according to claim 9, wherein the control program further causes the cluster control apparatus to execute:
    turning on the power of the second computer in the second group that is to belong to the first group when power to the second computer is turned off, prior to
    causing the second computer to belong to the first group.

12. The non-transitory computer-readable recording medium according to claim 9, wherein the control program further causes the cluster control apparatus to execute:
    canceling the first job executed by the first computer when the first computer become unable to execute the first job, and
    causing the second computer belonging to the first group to execute the cancelled first job.

\* \* \* \* \*